United States Patent [19]

Ellis

[11] 4,308,506
[45] Dec. 29, 1981

[54] FAST ACOUSTO-OPTIC Q-SWITCH LASER
[75] Inventor: Fred E. Ellis, Plano, Tex.
[73] Assignee: Texas Instruments Incorporated, Dallas, Tex.
[21] Appl. No.: 45,526
[22] Filed: Jun. 4, 1979
[51] Int. Cl.³ .............................................. H01S 3/10
[52] U.S. Cl. ............................................. 331/94.5 Q
[58] Field of Search .................... 331/94.5 Q; 350/358

[56] References Cited
U.S. PATENT DOCUMENTS
3,896,397 7/1975 de Witt et al. ................. 331/94.5 Q Primary Examiner—Martin H. Edlow
Assistant Examiner—Léon Scott, Jr.
Attorney, Agent, or Firm—Rene'E. Grossman; Melvin Sharp; James T. Comfort

[57] ABSTRACT

A fast acousto-optic Q-switch laser is taught comprising a lasing medium, reflecting means mounted substantially perpendicular to the longitudinal axis of the lasing medium and spaced from a first end thereof, feedback reflecting means spaced from a second end of the lasing medium, optical pumping means for pumping the lasing medium, an acousto-optic switch mounted along and tilted at a preselected angle with respect to the longitudinal axis of the lasing medium between the second end of the lasing medium and said feedback reflecting means and spaced from the second end of said lasing medium for deflecting a portion of the radiation emitted by the lasing medium, and first and second transducers mounted in opposition to each other on the switch, the first transducer mounted with respect to the switch such that the gradient of the envelope of the acoustic energy introduced into and propagated through the switch approximates the gradient of the non-uniform population inversion directly in the lasing medium, and the second transducer mounted with respect to the switch such that acoustic energy introduced into and propagated through the switch has a velocity vector opposite to the first transducer and timed to provide maximum feedback when lasing occurs, said feedback reflecting means positioned along and tilted at a preselected angle with respect to the longitudinal axis of said lasing medium related to the path to be taken by the deflected portion of radiation for reflecting said deflected portion of radiation back to said switch.

9 Claims, 12 Drawing Figures

AO PROPAGATION

FAST ACOUSTO-OPTIC Q-SWITCH LASER

This invention relates to lasers and more particularly to a laser having a fast acousto-optic Q-switch.

A laser system is an oscillator operated in the visible, ultraviolet or infrared portions of the frequency spectrum. It consists of an amplifier utilizing the principle of "light amplification by stimulated emission of radiation" and an optical feedback loop in which a portion of the output of the amplifier is fed back into the input of the amplifier for further amplification thereby causing the system to oscillate.

The amplifier is made of a laser material emitting at the desired wavelength. Some of the laser materials currently used are gases, glass, and semiconductors.

A typical laser system is that disclosed in U.S. Pat. No. 3,896,397, issued 22 July 1975 to Michiel de Wit et al for an "Acousto-Optically Q-Switched Laser." The system includes a laser rod pumped by a flash lamp. The laser rod is between two reflectors. One reflector is called the rod reflector and the other is called the Q-switch reflector. The Q switch is between the laser rod and the Q-switch reflector. The Q-switch is classified as a slow Q-switching device because its switching speed is greater than the laser pulse build-up time. The switching speed of the device ($t_s$) is determined by the velocity (v) of sound in acoustic material and the aperture (A) of the laser rod. For example, $$V_{QUARTZ} = 5.96 \times 10^6 \text{ mm/sec}$$

and for a five (5) mm laser rod, $$t_s = A/V_{QUARTZ} = 5/(5.96 \times 10^6) = 840 \text{ nano seconds (ns)}$$

The switching speed can be increased to about 420 ns by optimizing the optical configuration of the laser resonator (crossed porro prisms). Nevertheless, this is still too long compared to the laser build-up time which is about 200 ns. The disadvantage of slow switching time is post lasing. That is at the time the primary pulse is emitted the feedback covers only a portion of the laser rod aperture; thus, after the primary pulse the feedback continues to spread to other portions of the rod where high population inversion still exists and additional laser pulses are emitted as noise. Efforts to solve the post lasing problem have included lowering the doping level of laser rods such as Nd: YAG laser rods, developing new rod materials, varying the lengths of the rods, utilizing optical length stretchers, changing resonator geometrics and shaping the RF drive. None of these schemes has achieved substantial reduction in post lasing.

Accordingly, it is an object of this invention to provide a fast acousto-optic Q-switched laser;

Another object of the invention is to provide a fast acousto-optic Q-switched laser which is easy and economical to fabricate.

A further object of the invention is to remove substantially post lasing from an acousto-optic Q-switched laser.

Briefly stated the fast acousto-optic Q-switched laser comprises an amplifier and an optical feedback loop. The optical feedback loop includes a fast Q-switch having first and second transducers arranged to produce opposing velocity vectors which are timed to provide maximum feedback for the primary pulse.

The novel features believed to be characteristic of the invention are set forth in the appended claims. The invention itself, however, as well as other objects and advantages thereof may best be understood by reference to the following detailed description of an illustrative embodiment when read in conjunction with the accompanying drawings in which:

Figure 1:
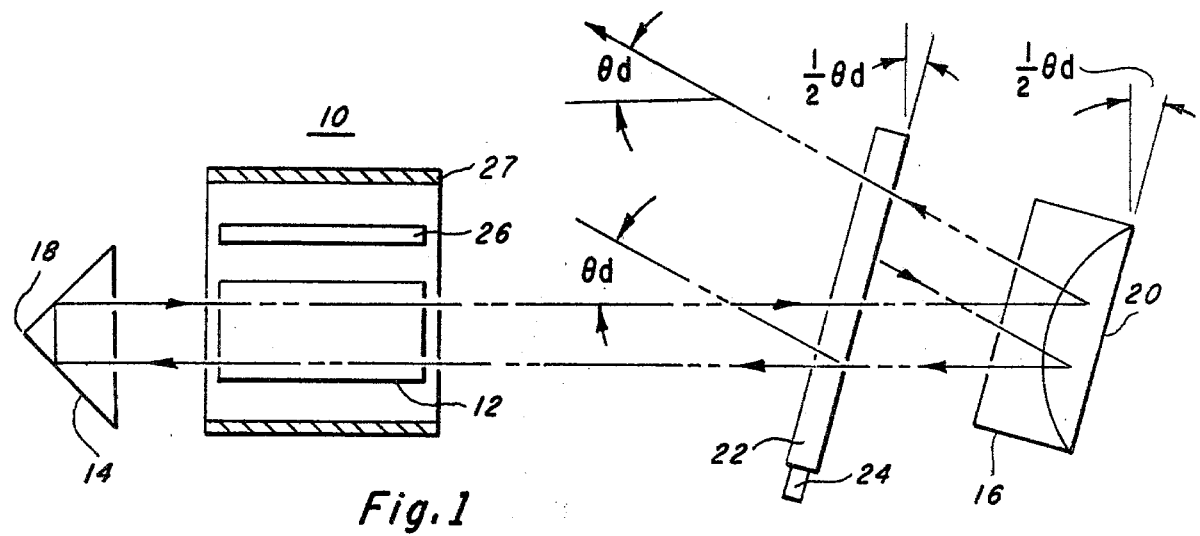
FIG. 1 is a side view of the prior art slow acousto-optic Q-switched laser with the R. F. source removed for clarity.

Referring now to FIG. 1 for a brief description of the prior art slow acousto-optic Q-switched laser, the principle elements of a slow Q-switched laser system 10 are shown. A rod 12 of lasing material, for example, Nd:YAG, is shown mounted between two reflectors 14 and 16. Reflector 14 is a Porro prism with its apex 18 lying in a plane perpendicular to the plane of the drawing. Reflector 16 is also a Porro prism, but with its apex 20 lying in the plane of the drawing.

Between laser rod 12 and the reflector 16 is an acousto-optic Q-switch 22, driven by a transducer 24, which applies acoustic energy to the switch.

A flash lamp 26 provides optical pumping energy for the laser rod 12. The flash lamp 26 and laser rod 12 are mounted in an internally reflecting elliptical wall 27.

The Porro prisms 14 and 16 and Q-switch 22 are in axial alignment with the longitudinal axis of the laser rod 12. The Q-switch 22 and the Porro prism 16 are tilted at preselected angles ($\frac{1}{2} \theta d$) to the vertical; $\theta d$ is the angle of reflection of the switch 22 and is the same as the angle of reflection of Porro prism 16.

When the Q-switch 22 is off, due to nonenergization of the acousto-optic Q-switch 22 by the transducer 24, radiation emanating from the laser rod 12 will pass in an essentially straight line through the acousto-optic switch 22, and will be reflected out of the feedback loop by the tilted reflector 16. The tilting of the Q-switch 22 serves to prevent undesired lasing action through direct reflection back into the rod from the surface of the Q-switch 22. The angle of tilt is the deflection angle for the Q-switch 22, which may be a Bragg cell.

When the transducer 24 is energized, an acoustic wave propagates, as hereinafter described in detail, across the acousto-optic switch 22, and the radiation paths may be traced as shown in FIG. 1.

Referring now to FIGS. 2a-2d, FIG. 2a shows the aperture of laser rod 12, Q-switch 22, and transducer 24. The RF drive (not shown) is connected to the transducer 24 through lead 30. The laser rod aperture 12 and Q-switch 22, which is a Bragg cell are centered on the optical axis Y.

When the transducer 24 is activated by the RF source at a preselected frequency an acoustic wave 32 (FIG.

Figure 2A:
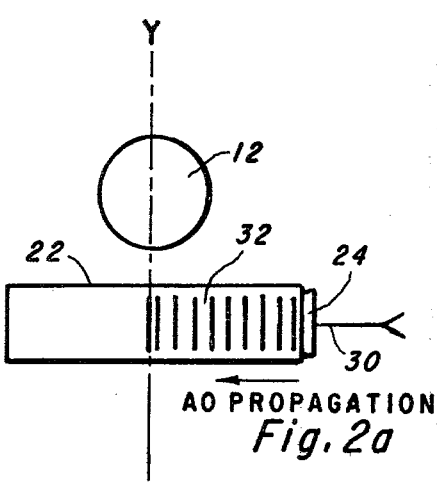
FIGS. 2a-2d show the relationship of feedback build-up and acousto-optic wave propagation for the slow acousto-optic Q-switched laser.
Figure 2B:
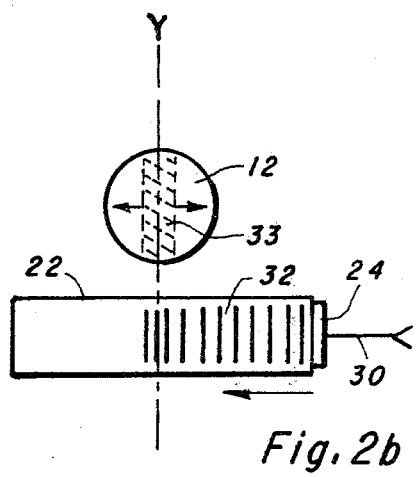
Figure 2C:
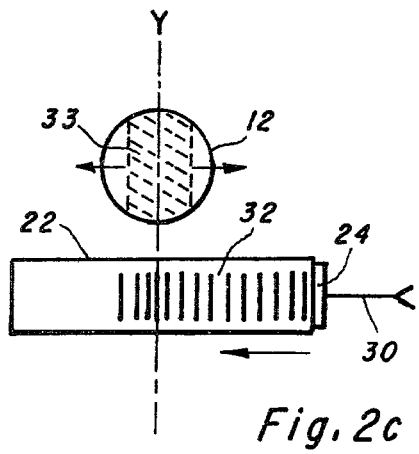
Figure 2D:
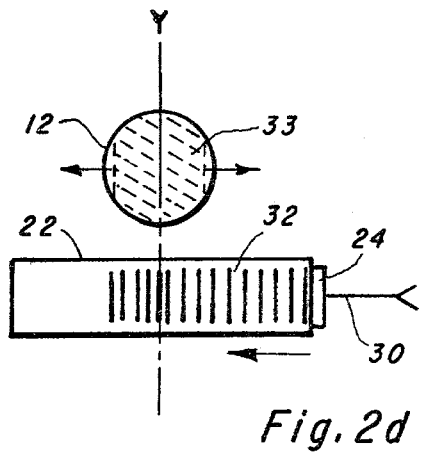

2a) is generated in the Bragg cell 22. The acoustic wave 32 travels from the transducer through the Bragg cell at the speed of sound for the Bragg cell medium until it reaches the optical axis Y. Feedback cannot take place until the acoustic wave crosses the rod porro prism apex 18. When the acoustic wave 32 reaches the optical axis, feedback of the light energy begins; the time this event occurs is designated t=0. At time t=100 ns the feedback area 33 moves outward from the optical axis as shown in FIG. 2b. At time t≈200 ns lasing occurs. However, the feedback area 33 (FIG. 2c) does not cover completely the aperture of the laser rod 12 and large residual inversion remains in the outer edge of the laser rod. Thus, at time t=200+ ns feedback 33 spreads as shown in FIG. 2d to rod aperture areas of high residual inversion and post lasing can occur.

Figure 3:
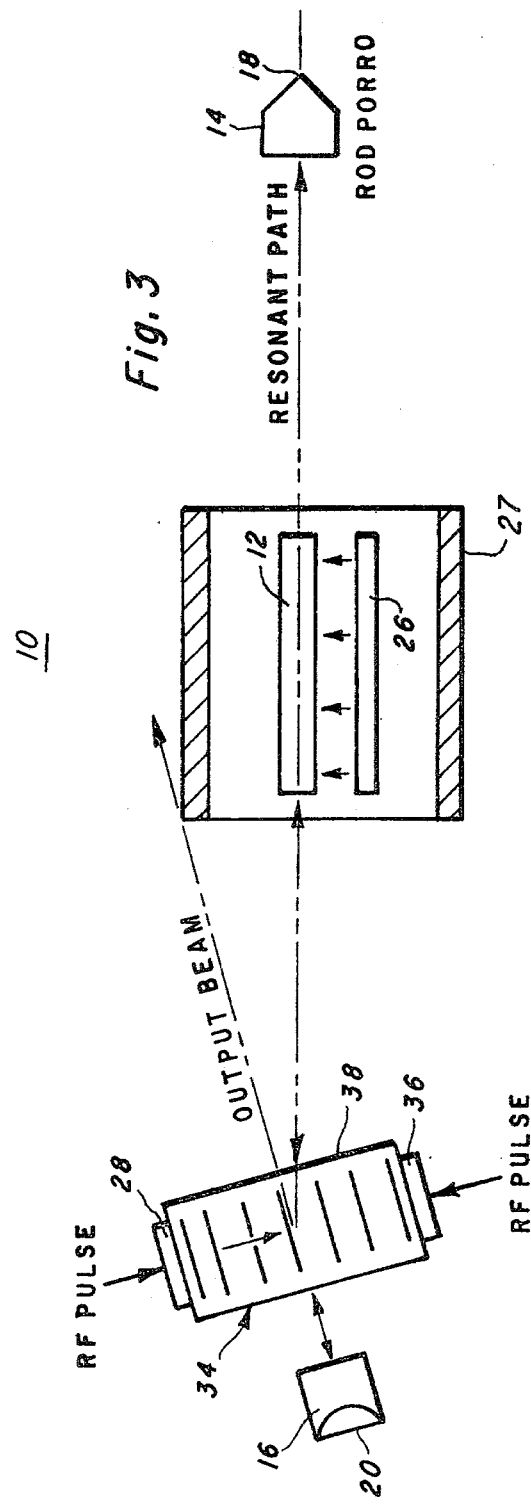
FIG. 3 is a side view of the fast acousto-optic Q-switched laser with the R. F. source removed for clarity.

Referring now to FIG. 3, the fast acousto-optic Q-switch laser is substantially that of FIG. 1 and like numbers will be used to designate like parts. The laser medium may be either gas or solid state depending upon the desired wavelength. For one micron wavelength, a rod 12, which may be, for example, a Nd:YAG rod is used. The rod is positioned together with a flash lamp 26 in a reflector cavity 27 which may be, for example, an internally reflecting elliptical wall. The flash lamp 26 is the source of optical pumping energy for the laser rod 12. The laser rod 12 is longitudinally disposed between two reflectors 14 and 16 with its center line forming the resonant wave path X of the laser 10. The reflectors 14 and 16 are retro-reflectors such as, for example, crossed Porro prisms. If reflector 14 is a Porro prism it is advantageous to mount it with its apex 18 perpendicular to the direction of acoustic propagation. This permits a folding action, which halves the effective transit time of the acoustic wavefront. Reflector 16 is mounted with its apex 20 parallel to the direction of acoustic propagation to form the crossed Porro prisms.

A fast Q-switch 34 is mounted between porro prism 16 and the end of laser rod 12 opposite to the end of the rod facing Porro prism 14. The fast Q-switch 34 is essentially a Bragg cell having opposing transducers 28 and 36 mounted on opposite ends. The Bragg cell may be, for example, a quartz slab 38 or a suitable glass such as that sold by Texas Instruments Incorporated as 1173 glass, and the transducers 28 and 36 may be, for example, bars of lithium niobate (LiNbo) attached to opposite ends of quartz slab 38 which are normal to the resonant wave path axis X of the laser.

Figure 4:
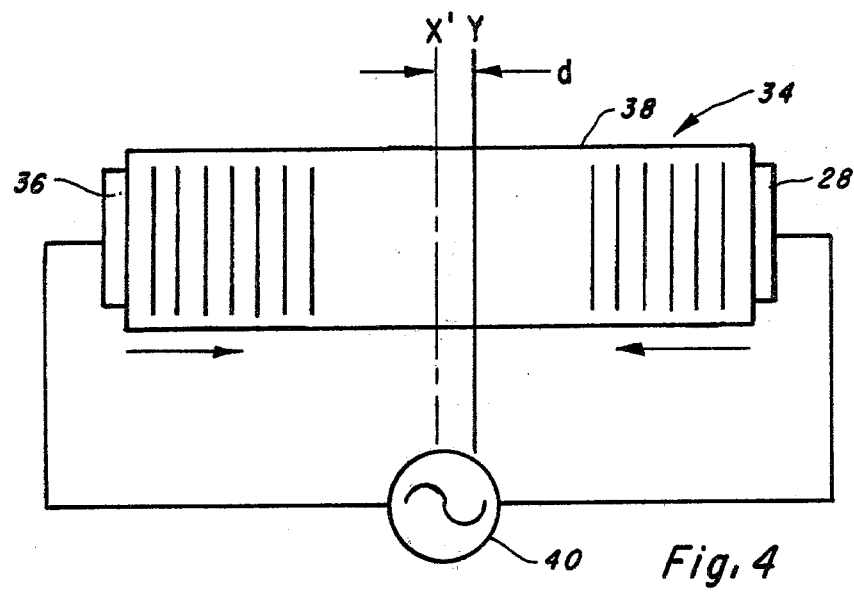
FIG. 4 is one embodiment of the Q-switch for the fast acousto-optic Q-switched laser.

In one embodiment (FIG. 4) an RF source 40 having a frequency of, for example, about 100 MHz is connected to each transducer 28 and 36 attached to Bragg cell 34. Bragg cell 34 is positioned with its center line $X^1$ off the optical axis Y a distance (d).

Figure 5:
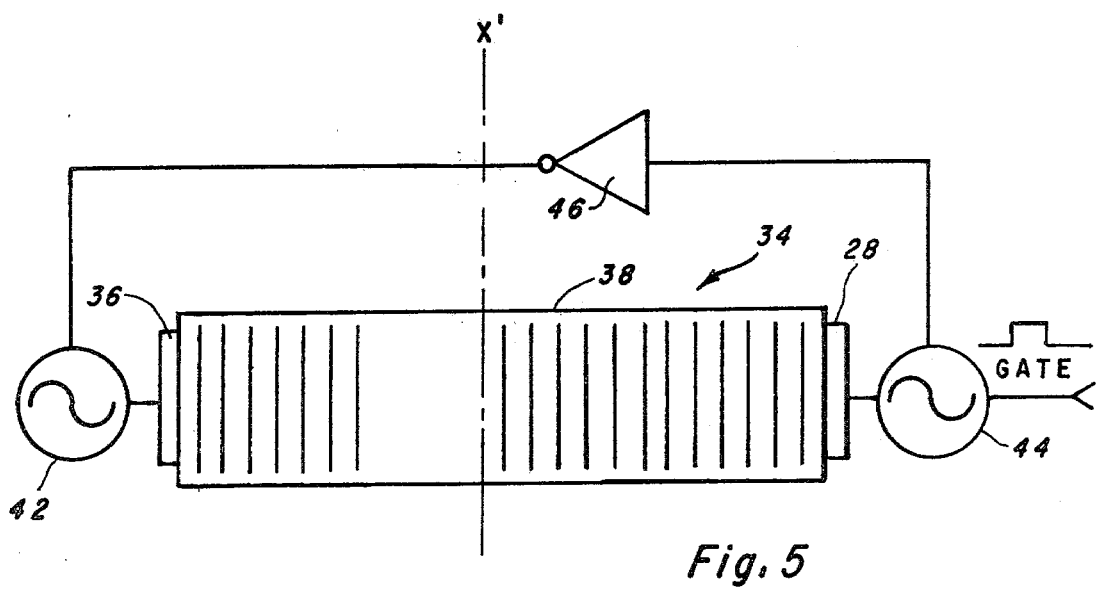
FIG. 5 is a second embodiment of the Q-switch for the fast acousto-optic Q-switched laser.

In a second embodiment (FIG. 5), the center line $X^1$ of the Bragg cell 34 coincides with the optical axis Y, and two sources of RF energy 42 and 44 having a frequency of, for example, about 100 MHz are connected to a delay timing mechanism 46 and to the transducers 28 and 36 attached to Bragg cell 34. The delay mechanism is, for example, an SN54221, dual one-shot, sold by Texas Instruments Incorporated. A gate signal from a source, not shown, enables RF source 44. The same gate signal delayed by the delay timing mechanism enables RF source 42.

In either embodiment (FIGS. 4 & 5) the second transducer 36 is used to generate an acoustic wave with a velocity vector opposite to the first transducer 28 and timed to provide a maximum feedback when lasing occurs. In the first embodiment (FIG. 4) the timing, as stated above, is obtained by positioning the center $X^1$ of the Bragg cell 34 off the optical axis Y a preselected amount (d) whereby the acoustic wave propagation path for the second transducer 36 is longer than that for the first transducer 28 and therefore takes longer to reach the optical axis Y. For a lasing medium with a 5 mm aperture and a quartz Bragg cell, the distance (d) is 1.25 mm. In the second embodiment (FIG. 5), as stated above, the center-line $X^1$ of the Bragg cell 34 coincides with the optical axis Y and the timer delays activation of the second transducer 36 a preselected amount of time after activation of the first transducer. For the Bragg cell 34 described above the time is 420 ns.

Figure 6A:
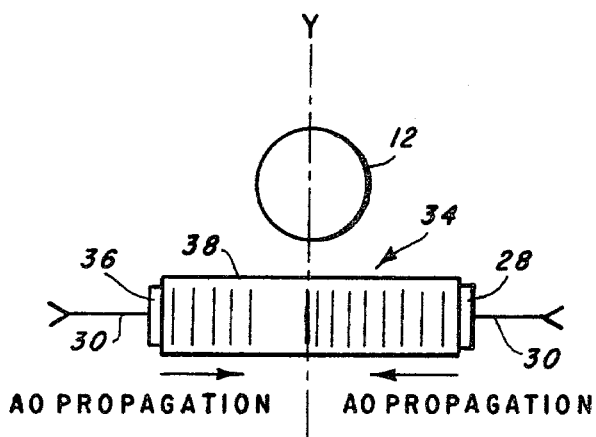
FIGS. 6a-6d show the relationship of feedback build up and acousto-optic wave propagation for a fast acousto-optic Q-switched laser.
Figure 6B:
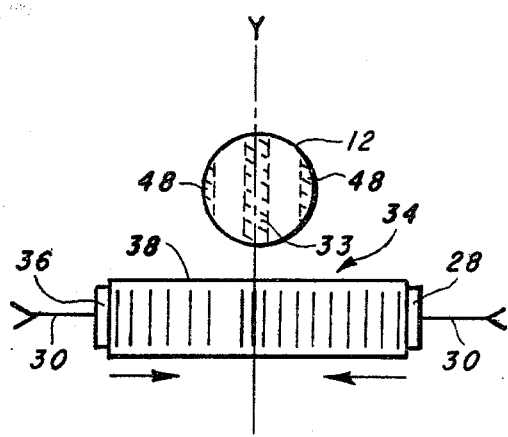
Figure 6C:
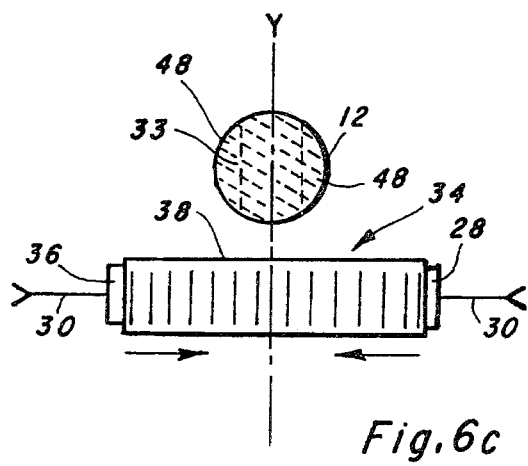
Figure 6D:
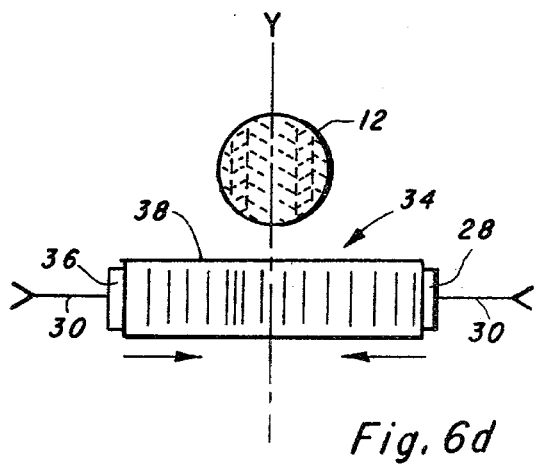

In either embodiment, the acoustic wave of the first transducer 28, as shown in FIG. 6a, after activation reaches the optical axis Y at time $t_o$ and at the same time the acoustic wave from the transducer 36 reaches the edge of the lasing aperture. Feedback occurs only when acoustic waves are present symetrically in both sides of the optical axis. At time t=100 ns (FIG. 6b) feedback 33 resulting from the first acoustic wave is spreading outward symetrically from the optical axis, and feedback 48, resulting from the combination of the first and second acoustic waves is spreading toward the optical axis from the edges of the lasing aperture. At time t≈200 ns when lasing occurs the acoustic waves meet and feedback 33 and 48 fill substantially the aperture and lasing takes place over the entire aperture. Finally at time t=200+ ns (FIG. 6d) areas of acoustic interference develop and little residual inversion remains in rod 12. As a result, post-lasing does not occur.

Although several embodiments of this invention have been described herein, it will be apparent to a person skilled in the art that various modifications to the details of construction shown and described may be made without departing from the scope of this invention.

What is claimed is:
1. An acousto-optic Q-switch laser comprising:
   (a) a lasing medium having first and second ends and a longitudinal axis therethrough;
   (b) an optical resonant cavity including reflecting means mounted substantially perpendicular to the longitudinal axis of the lasing medium and spaced from a first end thereof for reflecting radiation from said lasing medium back to said lasing medium and feedback reflecting means spaced from a second end of the lasing medium for reflecting radiation from said lasing medium;
   (c) pumping means for pumping the lasing medium; and
   (d) an acousto-optic switch mounted along and tilted at a preselected angle with respect to the longitudinal axis of the lasing medium between the second end of the lasing medium and said feedback reflecting means, said acousto-optic switch including acoustic-wave transmitting material and first and second acoustic wave generating mechanisms connected to said acoustic-wave transmitting material for generating acoustic waves having opposite velocity vectors therein to substantially eliminate post lasing of the lasing medium.

2. An acousto-optic Q-switch laser according to claim 1 wherein the first and second acoustic wave generating mechanisms are transducers for converting electrical signals to acoustic waves in the body of acoustic wave transmitting material, and further including an RF source connected to the transducers.

3. An acousto-optic Q-switch laser according to claim 2 wherein the first and second transducers are connected to opposing sides of said acoustic-wave transmitting material.

4. An acousto-optic Q-switch laser according to claim 2 wherein said acoustic wave transmitting material is a slab having the transducers mounted on opposing sides.

5. An acousto-optic Q-switch laser according to claim 2 wherein said acoustic wave transmitting material is positioned with its center line off a preselected distance from the longitudinal axis of the lasing medium whereby when the transducers are simultaneously actuated by the RF power source acoustic waves having opposing velocity vectors are produced and timed as to each other to eliminate post lasing from occurring in the lasing medium.

6. An acousto-optic Q-switch laser according to claim 2 wherein said acoustic-wave transmitting material is positioned with its center line coinciding with the longitudinal axis of the lasing medium and the RF source of power includes first and second RF sources, and a time delay mechanism, said first and second RF sources connected to the first and second transducers and to the time delay mechanism whereby the transducers produce opposing acoustic waves having velocity vectors timed to eliminate post lasing from occurring in the lasing medium.

7. An acousto-optic Q-switch laser according to claim 2 wherein the body of acoustic-wave transmitting material is taken from the group consisting of quartz and glass.

8. An acousto-optic Q-switch laser according to claim 2 wherein the first and second acoustic wave generating transducers are constructed of lithium niobate.

9. An acousto-optic Q-switch laser according to claim 2 wherein the acoustic wave of the first transducer reaches the longitudinal axis of the lasing medium at the same time as the acoustic wave of the second transducer reaches the edge of the lasing medium aperture within said switch.

* * * * *